(12) United States Patent
Takeuchi

(10) Patent No.: US 10,690,058 B2
(45) Date of Patent: Jun. 23, 2020

(54) AIRCRAFT FIRE SEAL STRUCTURE AND AIRCRAFT

(71) Applicant: MITSUBISHI AIRCRAFT CORPORATION, Aichi (JP)

(72) Inventor: Akira Takeuchi, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 399 days.

(21) Appl. No.: 15/831,507

(22) Filed: Dec. 5, 2017

(65) Prior Publication Data

US 2018/0156129 A1 Jun. 7, 2018

(30) Foreign Application Priority Data

Dec. 5, 2016 (JP) .................. 2016-235820

(51) Int. Cl.
*F02C 7/25* (2006.01)
*E04B 1/94* (2006.01)
*B64D 29/00* (2006.01)
*B64D 27/26* (2006.01)
*B64D 45/00* (2006.01)
*B64C 7/00* (2006.01)
*B64C 7/02* (2006.01)

(52) U.S. Cl.
CPC .................. *F02C 7/25* (2013.01); *B64C 7/00* (2013.01); *B64D 27/26* (2013.01); *B64D 29/00* (2013.01); *B64D 45/00* (2013.01); *E04B 1/948* (2013.01); *B64C 7/02* (2013.01); *B64D 2045/009* (2013.01)

(58) Field of Classification Search
CPC ..... F02C 7/25; B64C 7/00; B64C 7/02; E04B 1/948; B64D 27/26; B64D 29/00; B64D 45/00; B64D 2045/009
See application file for complete search history.

(56) References Cited

U.S. PATENT DOCUMENTS

| 3,695,639 | A | * | 10/1972 | Shire | B64D 37/005 285/114 |
| 5,251,917 | A | * | 10/1993 | Chee | B64D 27/00 244/129.1 |
| 2014/0262358 | A1 | * | 9/2014 | Livingston | A62C 3/08 169/45 |
| 2015/0048202 | A1 | | 2/2015 | Takeuchi | |
| 2018/0156130 | A1 | * | 6/2018 | Takeuchi | B64C 7/00 |
| 2018/0163631 | A1 | * | 6/2018 | Takeuchi | B64C 1/40 |

FOREIGN PATENT DOCUMENTS

JP 2014-141202 A 8/2014

* cited by examiner

*Primary Examiner* — Rodney A Bonnette
(74) *Attorney, Agent, or Firm* — Osha Liang LLP

(57) ABSTRACT

A fire seal structure prevents flame from coming out of a fire-prevention region of an aircraft. The fire seal structure includes: a first seal compressed and elastically deformed between two members of the aircraft; and a second seal pressed against the first seal in a direction intersecting a compression direction in which the first seal is compressed. A wall of the first seal pressed by the second seal includes a bent groove including at least one bent part.

14 Claims, 10 Drawing Sheets

AIRCRAFT FIRE SEAL STRUCTURE AND AIRCRAFT

BACKGROUND OF THE INVENTION

Field of the Invention

The present invention relates to a fire seal structure that prevents flame from coming out of a fire-prevention region of an aircraft.

Description of the Related Art

A fire-prevention region is designated around an ignition source from which flame may originate, such as an engine main body and an auxiliary power unit of an aircraft, and it is required to prevent the flame originating inside the fire-prevention region from coming out of the fire-prevention region.

For example, the fire-prevention region that confines the flame originating from the engine main body (engine core) is designated inside an engine nacelle.

When the fire originates from the engine main body, it is necessary to prevent the flame from coming through a gap between the engine nacelle and a pylon to blow off to the outside. Accordingly, the gap between the engine nacelle and the pylon is sealed by an elastic seal (JP 2014-141202 A).

In addition to structure members such as the engine nacelle and the pylon, various accessories necessary for operation of the engine main body are disposed around a portion at which the engine nacelle is supported to the pylon. The structure members and the accessories are closely disposed in a narrow region, and the region around the engine nacelle and the pylon has an extremely complicated structure.

When a gap between the members is sealed in order to prevent passage of the flame from the fire-prevention region around the engine main body in such a complicated structure, a seal receiving member on which the elastic seal is abutted is not secured and sealing is performed by inevitably abutting the elastic seals on each other in a portion of a sealing section, in some cases.

For example, the elastic seal is provided on the engine nacelle, along the front-rear direction in order to seal the gap between the engine nacelle and the pylon. In a case where the elastic seal faces a side wall of the other elastic seal extending along a lateral direction, if members respectively receiving the elastic seals are not disposed between the elastic seals, the elastic seals are directly abutted on each other.

However, the elastically-deformed elastic seals do not necessarily come into close contact with each other. A gap may form between the elastic seals because a shape of each of the elastically-deformed elastic seals is not defined.

For example, as illustrated in FIG. 10A, an elastic seal 81 provided on a member 80 is compressed and elastically deformed between a seal receiving member 82 and the member 80, and wrinkles 83 accordingly form on a side wall 81A originally flat of the elastic seal 81, in a direction orthogonal to a compression direction in a plane along the side wall 81A, as illustrated in FIG. 10B. A shape of the wrinkles 83 is not defined. When other elastic seal 84 is pressed against the side wall 81A as illustrated in FIGS. 10B and 10C, the elastic seal 84 cannot sufficiently follow the side wall 81A including the wrinkles 83. Accordingly, when a gap forms between the side wall 81A and a surface of the elastic seal 84 at a position of the wrinkles 83, flame F may come through the gap.

SUMMARY OF THE INVENTION

One or more embodiments of the present invention provide a fire seal structure for an aircraft and an aircraft that make it possible to sufficiently prevent flame from coming through a gap between elastic seals abutted on each other.

A fire seal structure according to one or more embodiments of the present invention prevents flame from coming out of a fire-prevention region of an aircraft. The fire seal structure includes a first seal configured to be compressed and elastically deformed between members configuring the aircraft, and a second seal configured to be pressed against the first seal in a direction intersecting a compression direction in which the first seal is compressed and be elastically deformed, in which a wall of the first seal pressed by the second seal includes a bent groove that includes at least one bent part.

The bent groove of one or more embodiments maintains the bent part while both of the first seal and the second seal are elastically deformed.

In the fire seal structure according to one or more embodiments of the present invention, the bent groove is preferably formed in advance on the wall of the first seal in an unloaded state.

In the fire seal structure according to one or more embodiments of the present invention, the bent groove preferably includes the bent part and extending parts that extend from the bent part toward both sides, and the bent groove is preferably bent to cause the extending parts to sandwich the bent part in a direction orthogonal to the compression direction of the first seal.

In the fire seal structure according to one or more embodiments of the present invention, a region of the wall excluding the bent groove may be made flat while no load is applied to the first seal.

In the fire seal structure according to one or more embodiments of the present invention, the wall may be recessed to follow a shape of a part to be pressed of the second seal while no load is applied to the first seal and may be configured to wrap the pressed second seal.

In the fire seal structure according to one or more embodiments of the present invention, the first seal is preferably compressed and elastically deformed in a front-rear direction between a frame and an engine pylon, and the second seal is preferably provided on an engine nacelle, and is pressed against the first seal from the side and is preferably elastically deformed in a direction intersecting the front-rear direction. The frame includes an opening that communicates, from forward, with an intake port of a heat exchanger supported to the engine pylon.

An aircraft according to one or more embodiments of the present invention includes the above-described fire seal structure.

According to the fire seal structure of one or more embodiments of the present invention, since the bent groove including the bent part is provided on the wall of the first seal against which the second seal is pressed, it is possible to deform the first seal while avoiding formation of wrinkles on the wall, and to easily bring the second seal into close contact with the wall through pressing.

The gap is provided at the position of the bent part of the bent groove between the first seal and the second seal while both of the first seal and the second seal are elastically deformed. Even if flame enters the gap, the flame cannot pass through the bent part because the flame does not turn. This makes it possible to sufficiently prevent the flame from coming out of the fire-prevention region through the gap between the first seal and the second seal.

DETAILED DESCRIPTION OF EMBODIMENTS

Embodiments of the present invention are described below with reference to accompanying drawings.

Figure 1:
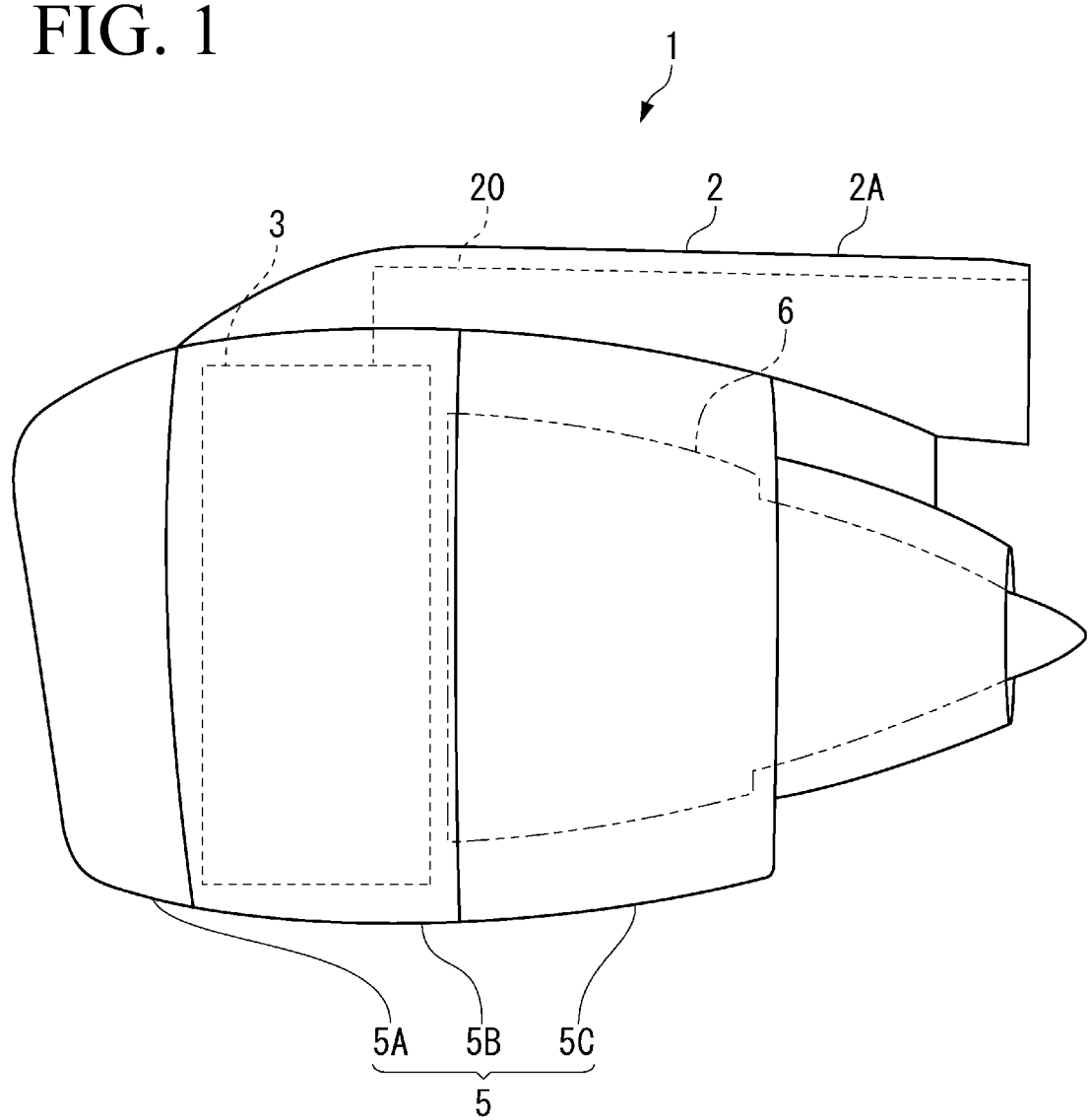
FIG. 1 is a diagram illustrating an engine and a pylon of an aircraft according to according to one or more embodiments of the present invention as viewed from the side.

An engine 1 of an aircraft illustrated in FIG. 1 is supported to an unillustrated main wing by a pylon 2.

For example, in a case of a turbo fan engine, the engine 1 includes a fan 3, an unillustrated main body (engine core) of the engine 1, and a cylindrical engine nacelle 5 that surrounds the fan 3 and the engine main body.

Figure 2:
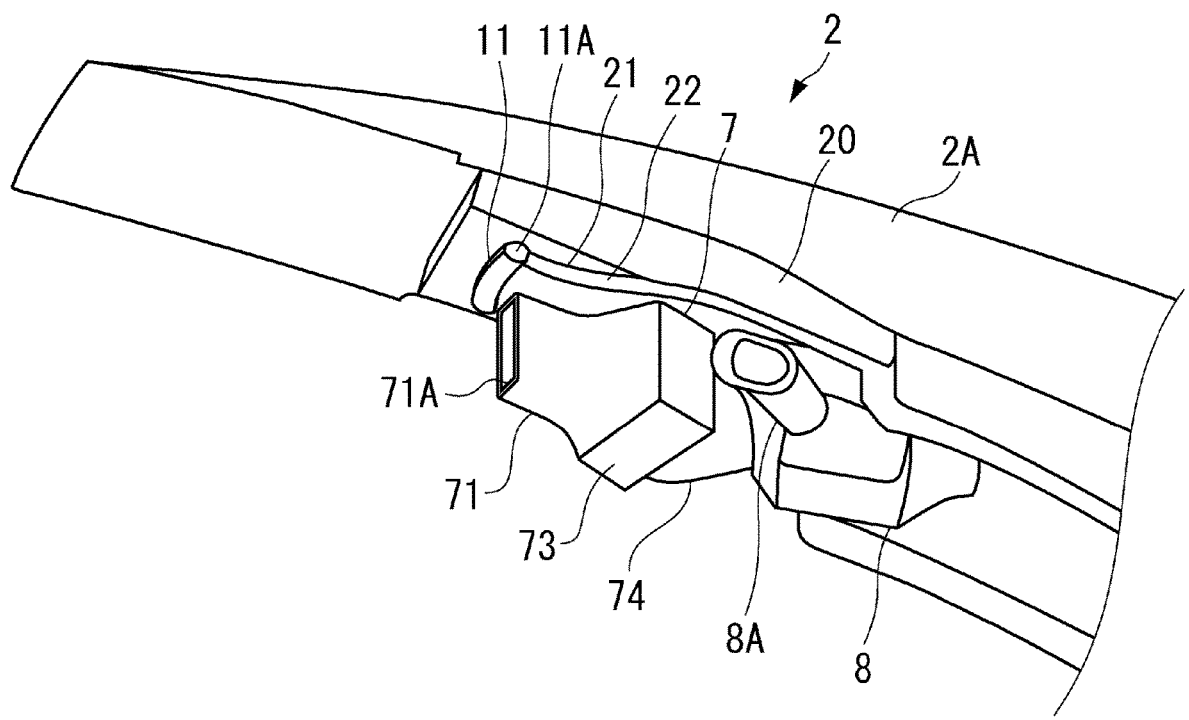
FIG. 2 is a perspective view illustrating the pylon illustrated in FIG. 1 and a heat exchanger supported to the pylon.

As illustrated in FIG. 1 and FIG. 2, the pylon 2 includes a pylon main body 20 as a structure member, and a pylon fairing 2A that covers the pylon main body 20. FIG. 1 and FIG. 2 each illustrate only a front-side part of the pylon 2, and illustration of a rear-side part is omitted.

In the present specification, "front" and "rear" respectively indicate front and rear in a traveling direction of the aircraft.

A fire-prevention region 6 is defined around the main body of the engine 1 for fire originating from the engine main body, and it is required to prevent flame from coming out of the fire-prevention region 6. In FIG. 1, an outer shape of the fire-prevention region 6 is illustrated by an alternate long and two short dashes line.

As illustrated in FIG. 1, the engine nacelle 5 includes an air inlet 5A that takes air into the fan 3, a fan cowl 5B that communicates with a rear end of the air inlet 5A, and a thrust reverser cowl 5C that communicates with a rear end of the fan cowl 5B.

The fan 3 is surrounded by the fan cowl 5B, and the engine main body is surrounded by the thrust reverser cowl 5C.

The thrust reverser cowl 5C is divided into a right part and a left part, and is pivotally supported by the pylon main body 20. The thrust reverser cowl 5C pivots about an unillustrated hinge part, thereby opening or closing an inside of the engine 1. An outer peripheral of the fire-prevention region 6 is defined by the thrust reverser cowl 5C and the pylon main body 20.

A nacelle seal 12 (FIG. 4) as a second seal is provided at a connection portion between the pylon main body 20 and the thrust reverser cowl 5C, in order to prevent flame from coming out of the fire-prevention region 6.

Various accessories are provided on the pylon main body 20. FIG. 2 illustrates a fitting 7 and a fitting 8 as parts of the accessories.

The fittings 7 and 8 are supported to a lower part of the pylon main body 20. The fittings 7 and 8 are located in the fire-prevention region 6.

In the following, a structure including an engine oil cooler as the fitting 7 (hereinafter, engine oil cooler 7) is described as an example.

The engine oil cooler 7 (heat exchanger) exchanges heat between air taken through an intake duct 71 from air flow supplied rearward by the fan 3 and an engine oil necessary for operation of the engine main body, thereby cooling the engine oil. Exhaust gas from the engine oil cooler 7 is discharged to the outside of the aircraft through an exhaust duct 74. Illustration of piping of the engine oil provided in the engine oil cooler 7 is omitted.

Figure 3:
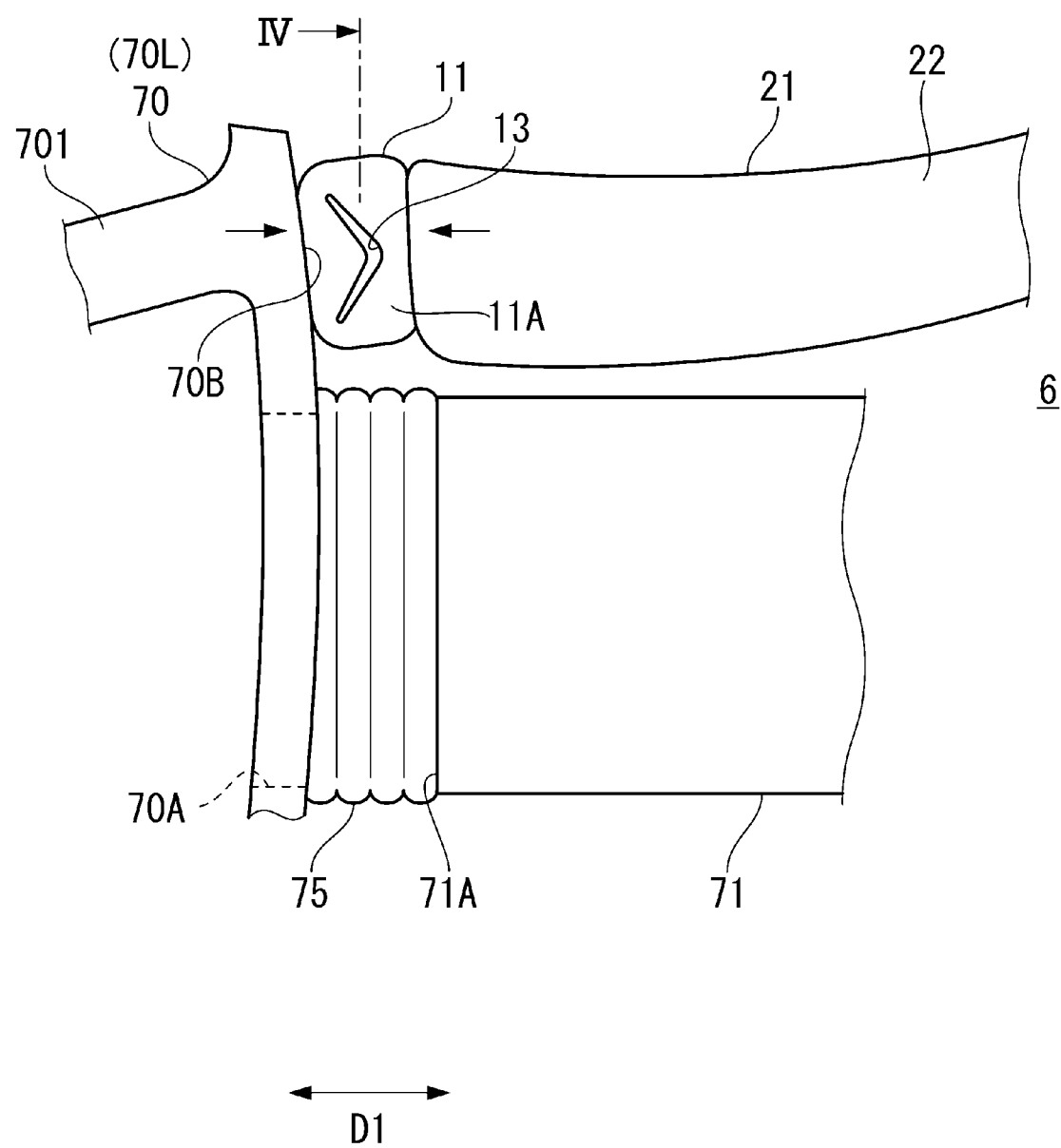
FIG. 3 is a side-wall view illustrating a first seal (AOC inlet seal) compressed in a front-rear direction according to one or more embodiments.

As illustrated in FIG. 3, an AOC inlet frame 70 is disposed forward of an intake port 71A of the intake duct 71 of the engine oil cooler 7. The AOC inlet frame 70 includes a substantially-rectangular opening 70A that communicates with the intake port 71A from the front side. Both of the intake port 71A and the opening 70A are directed forward, and face the fan 3 (FIG. 1). A bellows 75 connects a peripheral edge of the intake port 71A and a circumference of the opening 70A.

When the air flow supplied from the fan 3 enters the intake duct 71 from the opening 70A and is taken into a main body 73 (FIG. 2) of the engine oil cooler 7 through the intake duct 71, the engine oil is cooled.

The AOC inlet frame 70 is divided into a left-side member 70L (FIG. 3) and an unillustrated right-side member. Accordingly, even if a front space of the intake duct 71 is narrow, it is possible to dispose the AOC inlet frame 70 at a predetermined position forward of the intake duct 71 by inserting the right and left members 70 into a space between the fan 3 (FIG. 1) and the intake duct 71 from both sides.

The AOC inlet frame 70 is supported to the pylon main body 20, and extends downward from a position facing a lower part of the pylon main body 20 (hereinafter, pylon lower part 21) to a position beyond a lower end of the opening 70A toward the engine main body. To prevent flame from coming from the inside to the outside of the fire-prevention region 6, a seal member is interposed between the AOC inlet frame 70 and a counter member.

As one of such seal members, an AOC inlet seal 11 as a first seal is illustrated in FIG. 2. The AOC inlet seal 11 is provided on the pylon lower part 21 substantially along a lateral direction, and is abutted on the AOC inlet frame 70.

FIG. 2 illustrates the AOC inlet seal 11 in an unloaded state. The AOC inlet seal 11 is slightly curved following a shape of the AOC inlet frame 70 (FIG. 3), and extends from the left side to the right side of the opening 70A along an upper end of the opening 70A of the AOC inlet frame 70.

The AOC inlet seal 11 is formed in a hollow shape with use of a rubber material having favorable heat resistance, such as silicone rubber. A space (cavity) surrounded by a wall is provided inside the AOC inlet seal 11.

At least a surface of the AOC inlet seal 11 is preferably reinforced with use of fibers or a fabric.

When the AOC inlet frame 70 is assembled to the pylon main body 20, the AOC inlet seal 11 is compressed and elastically deformed in a front-rear direction D1 between the AOC inlet frame 70 and the pylon lower part 21 as illustrated in FIG. 3. A rear end part 70B of the AOC inlet frame 70 is a seal receiving part that comes into contact with a front end part of the AOC inlet seal 11. The AOC inlet seal 11 is in close contact with the rear end part 70B, thereby sealing a gap between the pylon lower part 21 and the AOC inlet frame 70 in the front-rear direction.

FIG. 3 illustrates the AOC inlet frame 70, the AOC inlet seal 11, and the pylon lower part 21 from the side (left side).

When the thrust reverser cowl 5C (FIG. 1) is closed, the nacelle seal 12 (FIG. 4) extending in the front-rear direction is abutted on all of the AOC inlet frame 70, the AOC inlet seal 11, and the pylon lower part 21 from the side.

Figure 4:
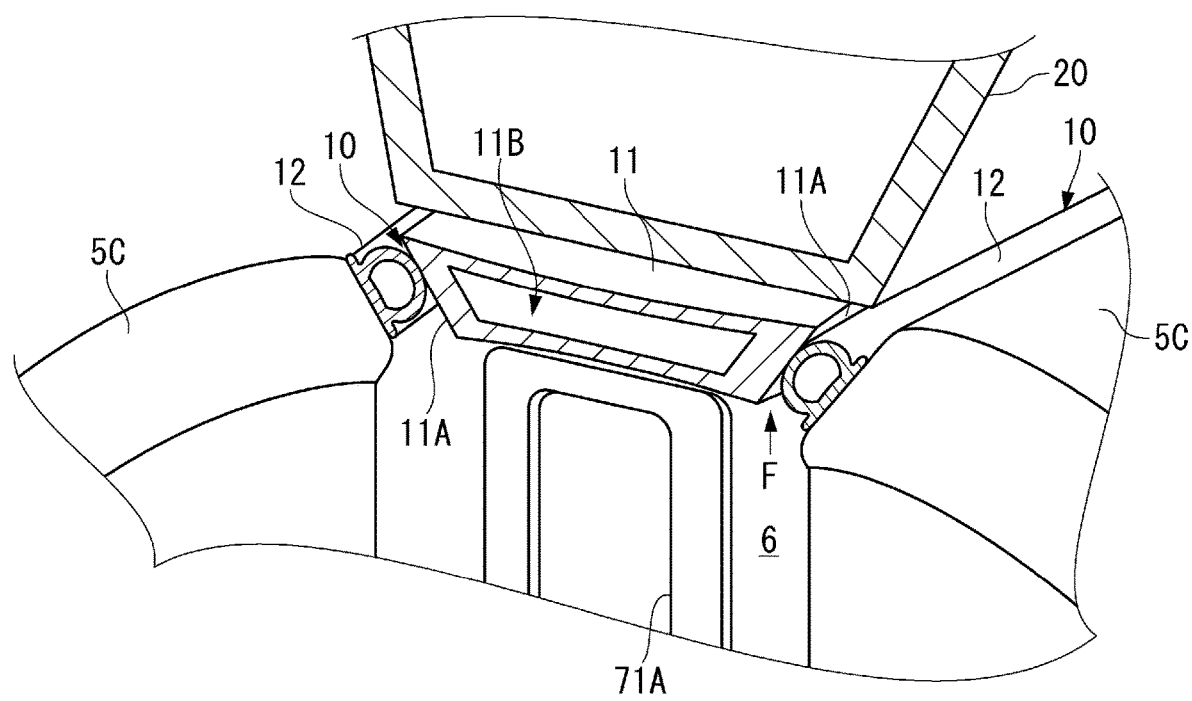
FIG. 4 is a perspective view illustrating a fire seal structure according to according to one or more embodiments that is broken at a position corresponding to a line IV in FIG. 3, in which a second seal (nacelle seal) is pressed against a side wall of the first seal from the side.

As illustrated in FIG. 4, the nacelle seal 12 is provided on each of a left-side member and a right-side member of the thrust reverser cowl 5C. The nacelle seal 12 seals a gap between the thrust reverser cowl 5C and both of the AOC inlet frame 70 and the pylon lower part 21 in the lateral direction.

The nacelle seal 12 is pressed against each of a side wall 701 of the AOC inlet frame 70, a side wall 11A of the AOC inlet seal 11, and a side wall 22 of the pylon lower part 21 illustrated in FIG. 3, from the lateral direction orthogonal to the front-rear direction D1 in which the AOC inlet seal 11 is compressed.

The nacelle seal 12 is formed in a hollow shape with use of a rubber material such as silicone rubber (FIG. 4). At least a surface of the nacelle seal 12 is also preferably reinforced with use of fibers or a fabric. The nacelle seal 12 illustrated in FIG. 4 has an Ω-shaped cross-section; however, the nacelle seal 12 may be formed in other shapes including a hollow part (e.g., P-shaped cross-section).

Each of the AOC inlet frame 70 and the pylon lower part 21 contains a metal material, a fiber-reinforced plastic, etc., and has rigidity to substantially prevent deformation even if pressed by the nacelle seal 12. The side wall 701 of the AOC inlet frame 70 and the side wall 22 of the pylon lower part 21 are each made flat or in a predetermined shape. The nacelle seal 12 comes into close contact with the side walls 701 and 22 with sufficient contact area.

In contrast, the AOC inlet seal 11 containing a rubber material is elastically deformable. If the AOC inlet seal 11 is not subjected to any support, whether the nacelle seal 12 that is also elastically deformable and the side wall 11A of the AOC inlet seal 11 are comes into close contact with each other depends on the situation. Typically, in a case where the elastic seals are pressed against each other, the shapes of the respective elastic seals after elastic deformation are not defined. Therefore, a gap may form between the elastic seals. It is necessary to prevent flame from coming through the gap.

In one or more embodiments, the thrust reverser cowl 5C is opened or closed while the AOC inlet frame 70 is assembled to the pylon main body 20. Therefore, the nacelle seal 12 is pressed against the side wall 11A of the AOC inlet seal 11 that has been already elastically deformed between the AOC inlet frame 70 and the pylon lower part 21.

Figure 10A:
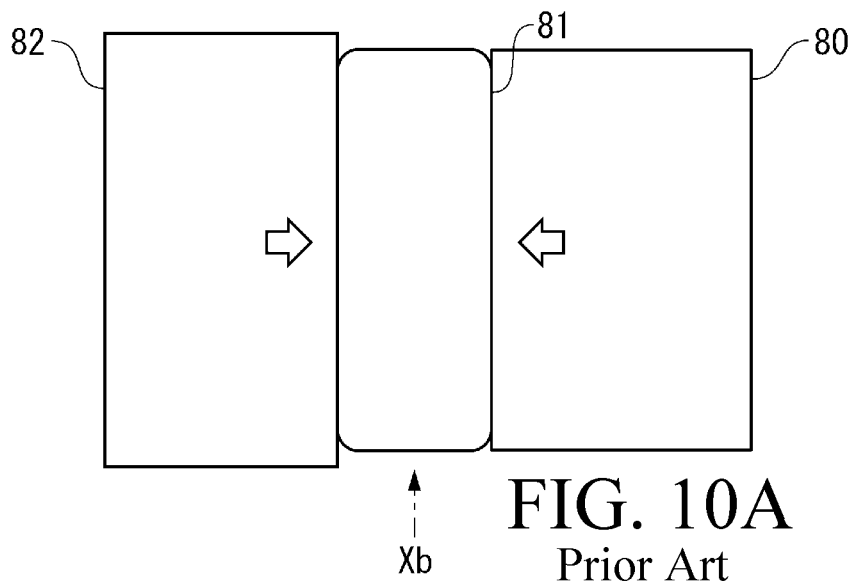
FIG. 10A is a schematic diagram illustrating a seal that is compressed and is elastically deformed between members.
Figure 10B:
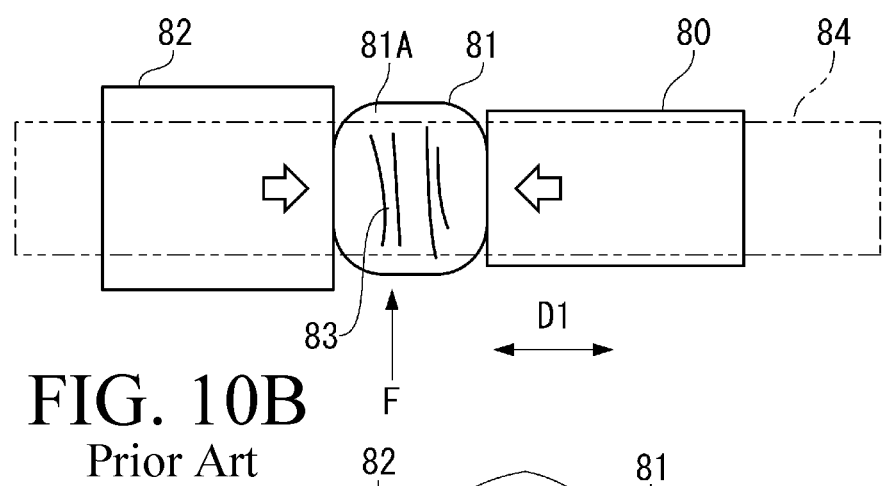
FIG. 10B is a schematic diagram illustrating a side wall of the seal as viewed from an Xb direction of FIG. 10A.
Figure 10C:
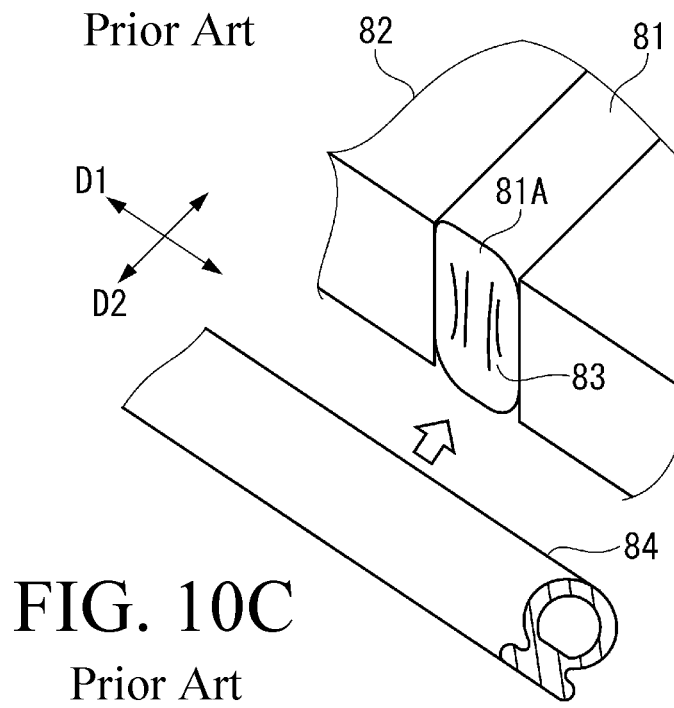
FIG. 10C is a schematic diagram illustrating a state where other seal is pressed against the side wall.

In the example of a common elastic seal, the elastic seal 81 is first elastically deformed between the members 80 and 82 as illustrated in FIG. 10B, and then, the elastic seal 84 is pressed against the side wall 81A of the elastic seal 81 as illustrated in FIG. 10C.

As illustrated, when undefined stripe-like wrinkles 83 form on the released side wall 81A due to previous elastic deformation of the elastic seal 81, and the elastic seal 84 is pressed against the side wall 81A on which the wrinkles 83 have formed, a gap easily forms between the side wall 81A and the surface of the elastic seal 84, at the position of the wrinkles 83.

As illustrated in FIG. 10B, the elastic seal 81 is dense due to pressurization in the direction D1 coupling the member 80 and the member 82. Therefore, even when the elastic seal 81 is thereafter pressed by the elastic seal 84 in the direction D2 orthogonal to the direction D1 (FIG. 10C), the elastic seal 81 is not easily elastically deformed unlike the case where the elastic seal 81 is compressed between the members 80 and 82. Accordingly, the side wall 81A is not necessarily sufficiently recovered to the state without the wrinkles 83 by repulsive force of the elastic seal 81. Further, the shape of the elastic seal 84 that has been pressed against the side wall 81A and accordingly elastically deformed is not defined. Therefore, the elastic seal 84 cannot necessarily sufficiently follow the irregularities of the surface of the side wall 81A.

Even if the wrinkles 83 as illustrated in FIG. 10B do not form on the side wall 81A, for example, in a case where the elastic seal 84 is pressed against the elastic seal 81 at the same time when the elastic seal 81 is compressed between the members 80 and 82, it is not possible to surely eliminate the gap between the side wall 81A and the elastic seal 84 because the shape of each of the elastic seal 81 and the elastic seal 84 after elastic deformation is not defined.

It is possible to perform a work to make the side wall 81A smooth for elimination of the wrinkles 83 before the elastic seal 84 is pressed against the side wall 81A; however, it is difficult to make the side wall 81A smooth to an appropriate surface with which the elastic seal 84 is brought into close contact, and the work takes much time.

For the reasons described above, it is difficult to surely eliminate the gap between the AOC inlet seal 11 and the nacelle seal 12 that are both elastic seals.

Even if flame enters the gap between the seals 11 and 12, however, when the gap has a bent shape, it is possible to prevent the flame from coming out of the fire-prevention region 6 through the gap because the flame does not turn due to straight travel property.

A fire seal structure 10 (FIG. 5) in which a bent gap is provided between the AOC inlet seal 11 and the nacelle seal 12 based on the above-described fact, to prevent passage of flame is described below.

"Fire seal" indicates prevention of flame originating inside the fire-prevention region 6 from coming out of the fire-prevention region 6.

Figure 5A:
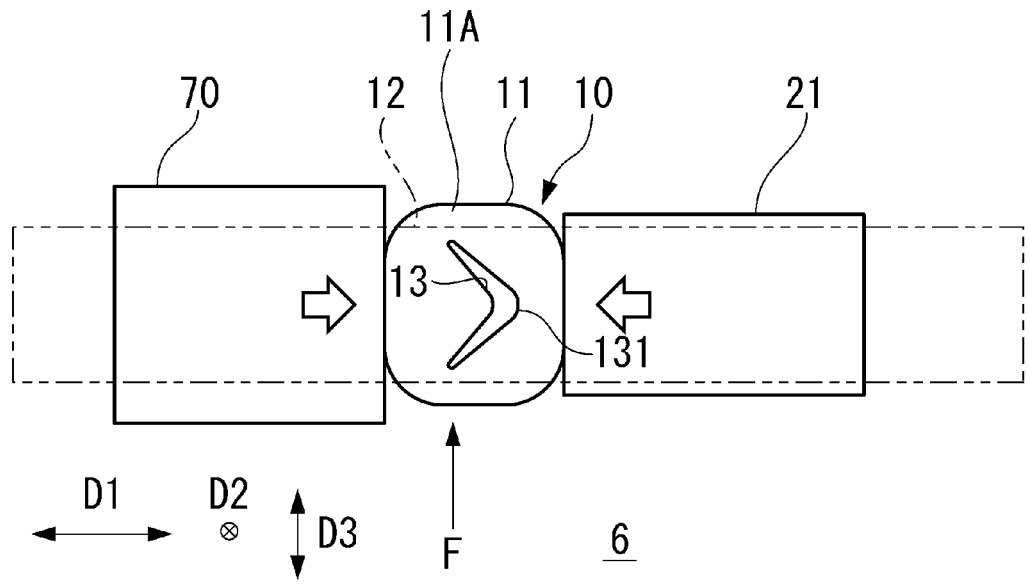
FIG. 5A is a schematic diagram illustrating a state where the first seal is compressed in the front-rear direction according to one or more embodiments.
Figure 5B:
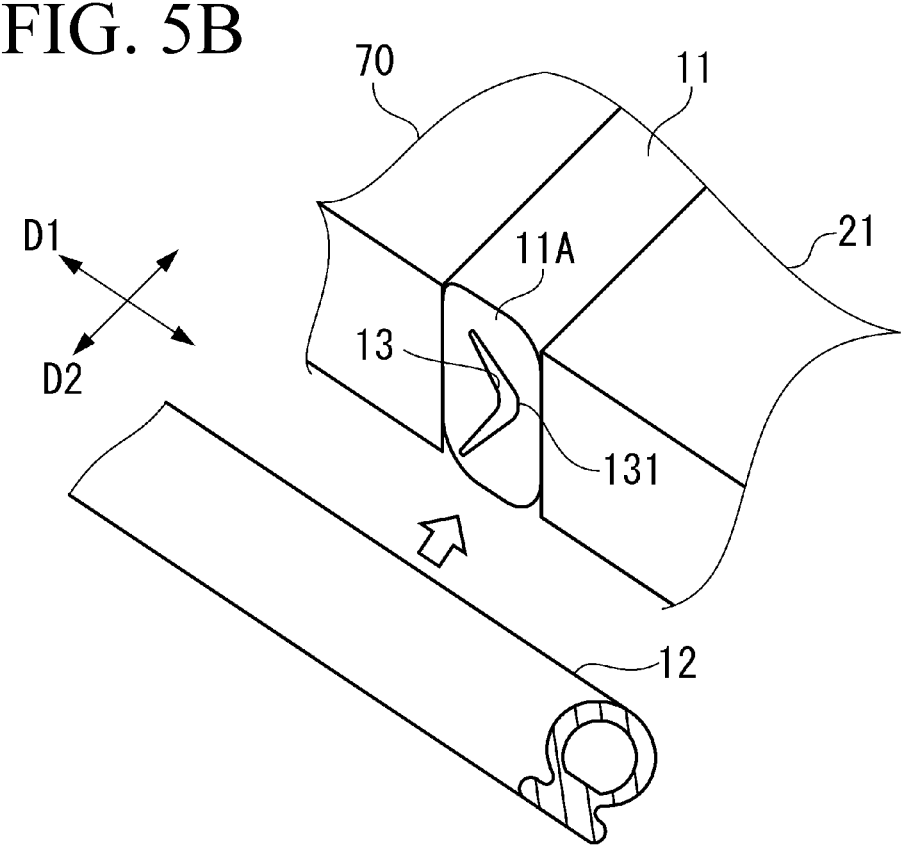
FIG. 5B is a schematic diagram illustrating a state where the second seal is pressed against the side wall of the first seal from a direction orthogonal to the front-rear direction.

As illustrated in FIGS. 5A and 5B, the fire seal structure 10 includes the AOC inlet seal 11 and the nacelle seal 12 both described above, and a bent groove 13 is provided, in the AOC inlet seal 11 that is compressed in the front-rear direction D1. The bent groove 13 is recessed from the surface of the side wall 11A against which the nacelle seal 12 is pressed, and deforms the AOC inlet seal 11 in an intended shape in order to prevent formation of the above-described wrinkles 83.

In other words, the fire seal structure 10 has a feature at a portion at which the side wall 11A of the AOC inlet seal 11 and the nacelle seal 12 are abutted on each other.

The bent groove 13 is formed in a shape including at least one bent part 131, and is recessed along the direction D2 orthogonal to the front-rear direction D1 in a direction in which the nacelle seal 12 is pressed against the AOC inlet seal 11.

Figure 6A:
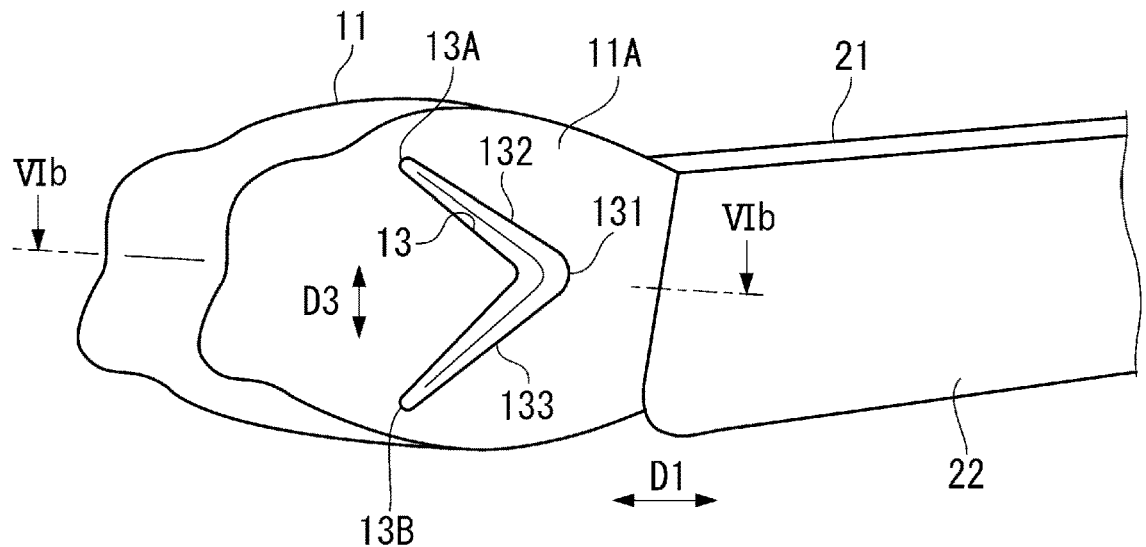
FIGS. 6A and 6B are diagrams each illustrating the first seal in an unloaded state according to one or more embodiments, FIG. 6A being a perspective view, and FIG. 6B being a cross-sectional view taken along a line VIb-VIb of FIG. 6A.
Figure 6B:
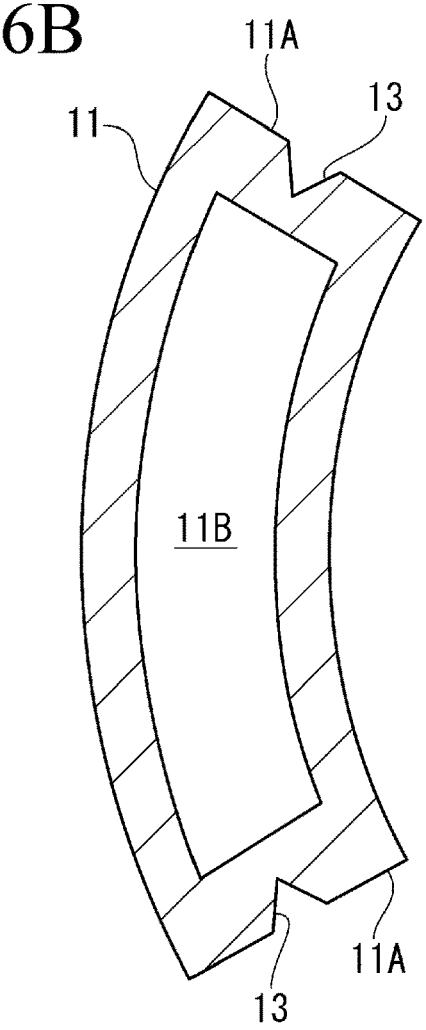

FIGS. 6A and 6B each illustrate the AOC inlet seal 11 in an unloaded state. As illustrated in FIG. 6B, the bent groove 13 is formed in each of the left and right side walls 11A, 11A of the AOC inlet seal 11. The bent groove 13 does not penetrate up to an internal space 11B of the AOC inlet seal 11.

The AOC inlet seal 11 is formed so as to protrude forward from the pylon lower part 21 by a predetermined dimension when the AOC inlet seal 11 is crushed in the front-rear direction (FIG. 5A), in order to seal the gap between the AOC inlet frame 70 and the pylon lower part 21.

The AOC inlet seal 11 that is formed with use of a rubber material such as silicone rubber, includes the bent groove 13 that includes a bent part 131 and is already formed so as to be recessed from the surface of the side wall 11A. In other words, the bent groove 13 is formed in advance in the side wall 11A of the AOC inlet seal 11 in an unloaded state (FIG. 6A). The surface of the region of the side wall 11A excluding the bent groove 13 is made flat while no load is applied to the AOC inlet seal 11 (FIG. 4).

In a case where fibers or a fabric is used for reinforcement in addition to the rubber material, the AOC inlet seal 11 is preferably formed such that the fibers or the fabric is continuous over the entire surface of the side wall 11A including the bent groove 13 without missing of the fibers or the fabric at the position of the bent groove 13. This makes it possible to secure reinforcing effect by the fibers or the fabric.

The bent groove 13 maintains the bent part 131 also after the AOC inlet seal 11 is compressed and is accordingly deformed in the front-rear direction D1 as illustrated in FIG. 5A.

When the bent groove 13 is formed in advance in formation of the AOC inlet seal 11, it is possible to surely form the gap including the bent part 131 between the side wall 11A and the nacelle seal 12 while the AOC inlet seal 11 is compressed and the nacelle seal 12 is pressed against the side wall 11A.

For example, as illustrated in FIG. 6A, the bent groove 13 may be formed in a sideways V-shape. In this case, the bent groove 13 is bent at an approximately intermediate position between an upper end 13A and a lower end 13B. A section (extending part 132) from the upper end 13A to the bent part 131 and a section (extending part 133) from the bent part 131 to the lower end 13B are both inclined to the vertical direction.

At this time, a direction orthogonal to the compression direction (front-rear direction D1) in which the AOC inlet seal 11 is compressed in an in-plane direction of the side wall 11A of the AOC inlet seal 11 is denoted by D3. The bent groove 13 is bent so as to cause the extending parts 132 and 133 extending from the bent part 131 to both sides to sandwich the bent part 131 in the direction D3. Bent grooves illustrated in FIG. 7A to FIG. 9B described later are similarly formed. When the bent groove 13 is formed in such a manner and the AOC inlet seal 11 is compressed in the direction D1, the AOC inlet seal 11 shows deformation behavior in which the entire groove (V-shape in example of FIG. 6A) is opened and extends in the direction D3.

The bent groove 13 may have, for example, a V-shaped cross-section as with the cross-section of the AOC inlet seal 11 illustrated in FIG. 6B. In addition, the bent groove 13 may be formed to have a U-shaped cross-section or a rectangular cross-section.

The bent groove 13 forms, on the side wall 11A of the AOC inlet seal 11 compressed in the front-rear direction, the bent gap that prevents passage of flame.

Accordingly, as illustrated in FIG. 6A, the bent groove 13 extends in the vertical direction and has a width to some extent in the front-rear direction, and functions as an escape clearance of deformation of the AOC inlet seal 11 compressed in the front-rear direction. When the AOC inlet seal 11 is compressed in the front-rear direction D1 (FIG. 5A), the side wall 11A is elastically deformed such that the bent groove 13 extends in the direction D3 as a whole (V-shape is opened) and the width of the bent groove 13 is reduced. Therefore, the side wall 11A does not protrude in a ridge shape in an out-plane direction, which makes it possible to prevent the stripe-like wrinkles 83 from forming between the protrusions.

As described above, when the bent groove 13 is formed in advance, the AOC inlet seal 11 shows the predetermined deformation behavior in pressurization, and formation of the undefined wrinkles 83 after the deformation is prevented. This makes it possible to provide, in the side wall 11A after deformation, the groove having the intended shape with the bent part 131 as a center.

As a result that deformation of the AOC inlet seal 11 is controlled in the above-described manner, it is possible to remain the bent groove 13 and to obtain a surface with less irregularities at a position of the side wall 11A other than the bent groove 13.

The bent groove 13 after the AOC inlet seal 11 is compressed in the front-rear direction D1 (FIG. 5A) maintains the bent part 131 even though the bent groove 13 deformed to a shape extended in the vertical direction from the shape before the compression (FIG. 6A).

Thereafter, as illustrated in FIG. 5B, when the nacelle seal 12 is pressed against the side wall 11A including the bent groove 13 in closing the thrust reverser cowl 5C, the side wall 11A is easily elastically deformed because the strength thereof is decreased due to formation of the bent groove 13. Accordingly, it is easy to bring the side wall 11A of the AOC inlet seal 11 and the surface of the nacelle seal 12 into close contact with each other. Even if the bent groove 13 is deformed or the depth thereof is decreased when the nacelle seal 12 is pressed against the side wall 11A of the AOC inlet seal 11 from the direction D2 (lateral direction), a clearance is maintained at the bent part 131 and in the vicinity of the bent part 131. Further, the gap corresponding to an inner space of the bent groove 13 remains between the surface of the side wall 11A and the surface of the nacelle seal 12.

As described above, according to the fire seal structure 10, the bent groove 13 of the AOC inlet seal 11 makes it possible to form the gap having the intended shape including the bent part 131, between the side wall 11A of the AOC inlet seal 11 and the nacelle seal 12, in a state where the AOC inlet seal 11 is compressed in the front-rear direction D1 and the nacelle seal 12 is pressed against the side wall 11A of the AOC inlet seal 11 (FIG. 4).

As a result, even if flame inside the fire-prevention region 6 enters the gap between the side wall 11A and the nacelle seal 12, it is possible to prevent the flame F from coming out of the fire-prevention region 6 through the gap because the flame F cannot come through the bent part 131 (FIG. 5A).

In addition, in the case where the bent groove 13 is formed, the side wall 11A is easily elastically deformed and comes into close contact with the AOC inlet frame 70 on the front side and the pylon lower part 21 on the rear side when the nacelle seal 12 is pressed against the side wall 11A even while the AOC inlet seal 11 is compressed. This makes it possible to surely seal a boundary of the AOC inlet seal 11 with the front member 70 and the rear member 21 as well. Accordingly, it is possible to sufficiently prevent the flame from coming through the boundary.

The width of the bent groove 13 (FIG. 6A) formed in advance in the AOC inlet seal 11 is gradually varied so as to become wide at the center bent part 131 and to become smaller at the end parts (13A and 13B) than at the center bent part 131. This makes it possible to elastically deform the side wall 11A smoothly and to leave a clearance even with a fine width at the bent part 131 and in the vicinity of the bent part 131 in the side wall 11A while absorbing the deformation amount into the bent groove 13, when the AOC inlet seal 11 is compressed in the front-rear direction D1 (FIG. 5A) or when the nacelle seal 12 is pressed against the side wall 11A from the side (FIG. 5B). The bent groove 13 has the V-shaped cross-section, which also contributes to the smooth deformation.

The width, the shape of the cross-section, the depth from the surface of the side wall 11A, etc. of the bent groove 13 may be appropriately determined according to the deformation state of the side wall 11A, the strength of the side wall 11A, tests and simulation to verify the form of the bent groove 13, etc.

The depth of the bent groove 13 is appropriately settable as long as the bent groove 13 does not penetrate up to the internal space 11B of the AOC inlet seal 11.

Bent grooves that are adoptable in place of the bent groove 13 are illustrated in FIGS. 7A,7B and FIGS. 8A-8C.

FIGS. 7A,7B and FIGS. 8A-8C illustrate the bent grooves when no load is applied to the AOC inlet seal 11.

Figure 7A:
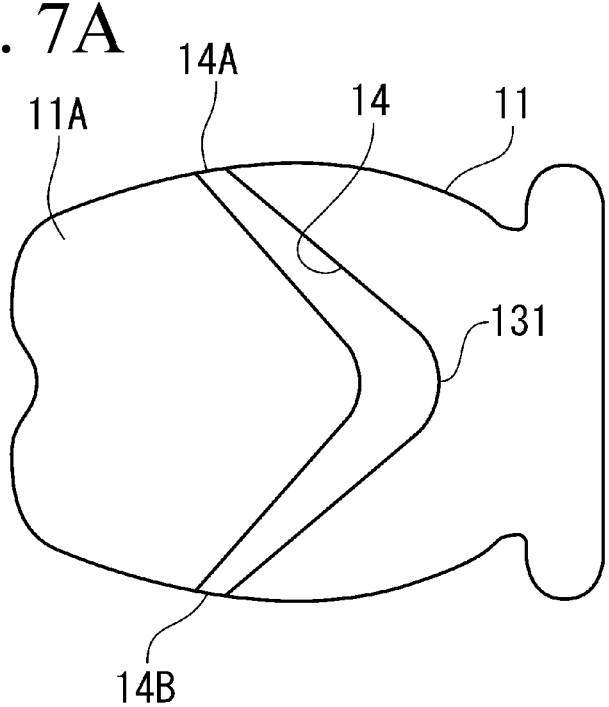
FIGS. 7A and 7B are diagrams each illustrating a modification of the first seal according to one or more embodiments.

A bent groove 14 illustrated in FIG. 7A is provided from the upper end to the lower end over the entire side wall 11A of the AOC inlet seal 11. An upper end 14A of the bent groove 14 penetrates through a top surface of the AOC inlet seal 11, and a lower end 14B of the bent groove 14 penetrates through a bottom surface of the AOC inlet seal 11.

Figure 7B:
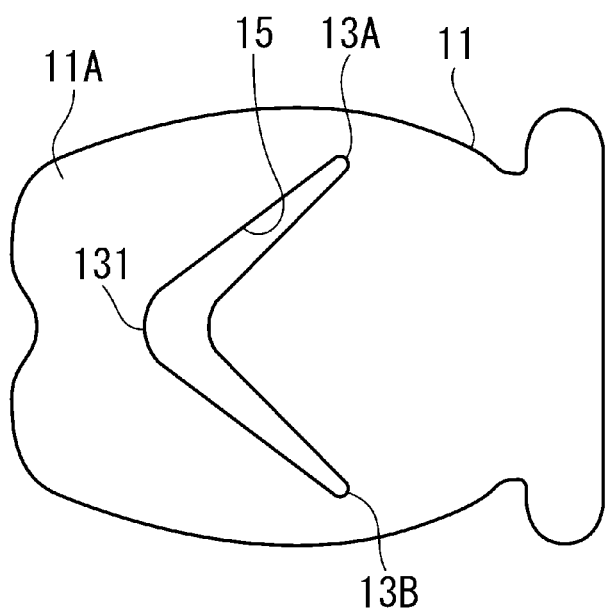

A bent groove 15 illustrated in FIG. 7B has a sideways V-shape such that the bent part 131 is located forward of the upper end 13A and the lower end 13B.

Figure 8A:
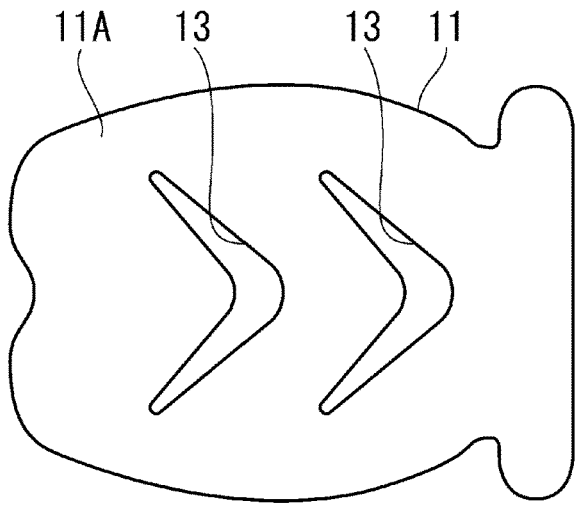
FIGS. 8A to 8C are diagrams each illustrating a modification of the first seal according to one or more embodiments.
Figure 8B:
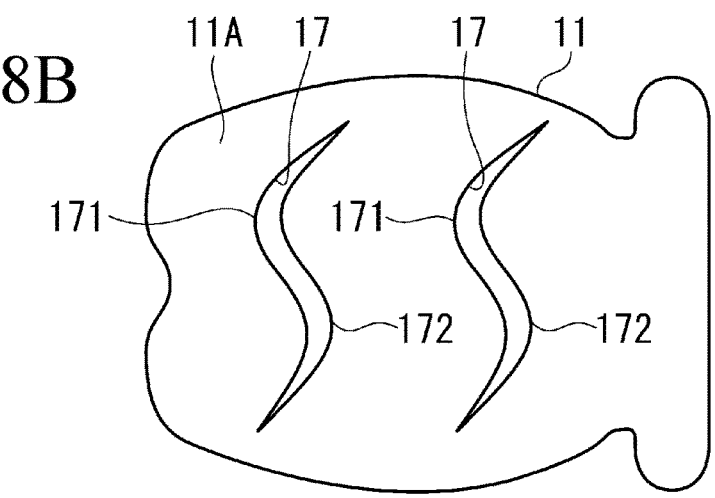

As illustrated in FIGS. 8A and 8B, two or more bent grooves may be provided in the side wall 11A of the AOC inlet seal 11. Deformation amount of the AOC inlet seal 11 is absorbed inside the plurality of bent grooves, which makes it possible to sufficiently prevent wrinkles of the side wall 11A.

In FIG. 8A, two bent grooves 13 are provided side by side in the front-rear direction in the side wall 11A.

Also in FIG. 8B, two bent grooves 17 are provided side by side in the front-rear direction in the side wall 11A. Each of the bent grooves 17 has an S-shape including two bent parts 171 and 172. The bent parts 171 and 172 are bent in directions opposite to each other.

Figure 8C:
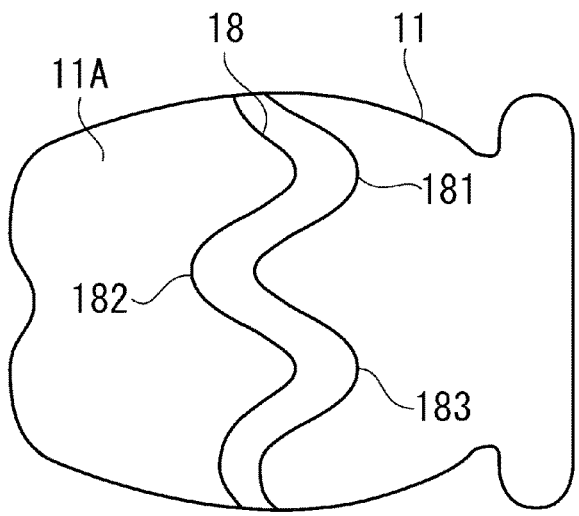

A bent groove 18 illustrated in FIG. 8C includes three bent parts 181, 182, and 183.

When the bent groove is formed in a meandering labyrinth shape (maze shape) including a plurality of bent parts as with the bent groove 17 or the bent groove 18, the plurality of bent parts are located ahead of the spreading direction of the flame. This makes it possible to more surely inhibit passage of the flame.

It is sufficient to set each of the width and the depth of the above-described bent groove 13 and the like to a minimum size that allows for compression of the AOC inlet seal 11 in the front-rear direction with avoiding formation of wrinkles on the side wall 11A. When the AOC inlet seal 11 is compressed in the front-rear direction, it is sufficient that only a minute clearance remains at the bent part 131 of the bent groove 13 and in the vicinity of the bent part 131. The bent groove 13 and the like may be formed with a fixed width as long as the clearance remains at at least one bent part 131 and in the vicinity of the bent part 131.

Next, a fire seal structure 30 according to one or more embodiments of the present invention is described with reference to FIG. 9A and FIG. 9B.

Figure 9A:
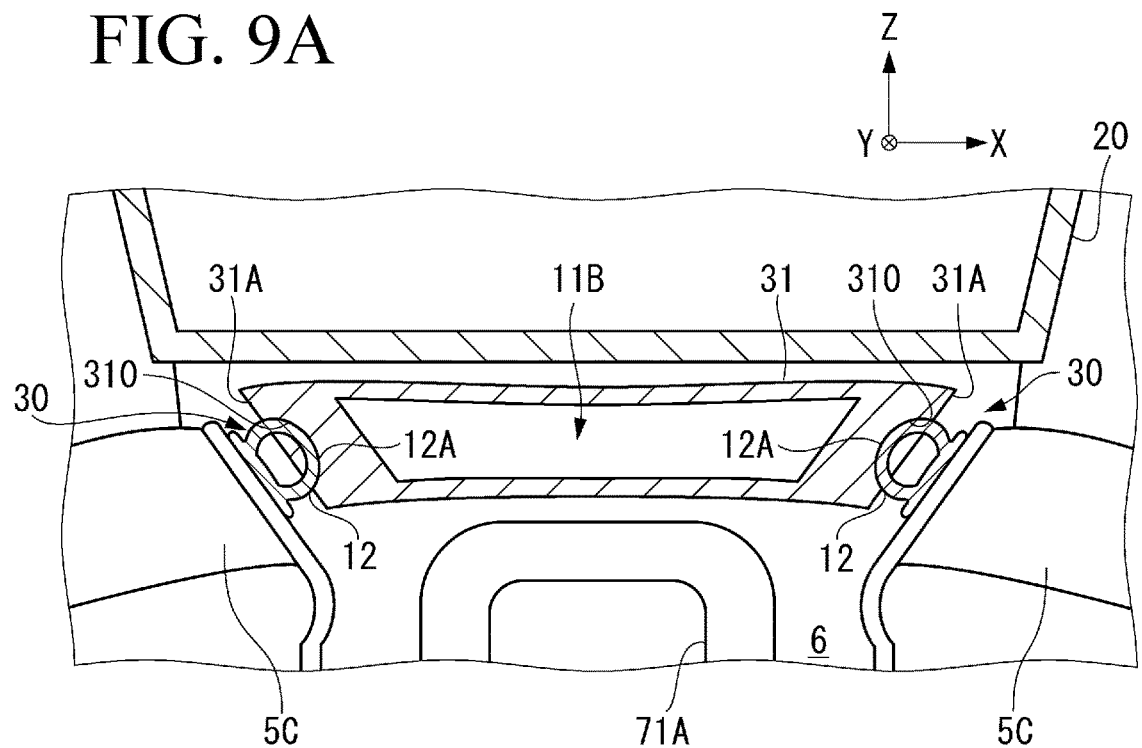
FIG. 9A is a diagram illustrating a fire seal structure according to one or more embodiments as viewed from the front side.
Figure 9B:
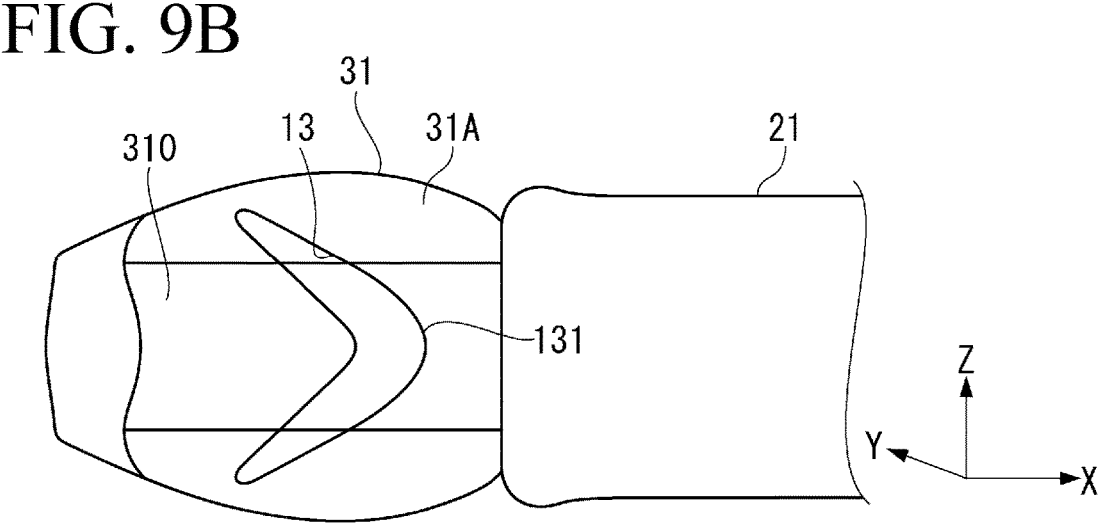
FIG. 9B is a perspective view illustrating a first seal according to one or more embodiments.

As illustrated in FIGS. 9A and 9B, a concave part 310 is provided on the side wall 31A of an AOC inlet seal 31 of the fire seal structure 30. The concave part 310 is recessed from a surface of the side wall 31A, following the shape of the nacelle seal 12.

A part 12A of the nacelle seal 12 that is to be pressed against the side wall 31A is curved so as to protrude toward the AOC inlet seal 31 as illustrated in FIG. 9A, and is received inside the concave part 310.

As illustrated in FIG. 9B, the bent part 131 of the bent groove 13 is located within a range where the concave part 310 is provided.

As illustrated in FIG. 9A, when the nacelle seal 12 is pressed against the side wall 31A of the compressed AOC inlet seal 31, it is possible to avoid formation of wrinkles on the side wall 31A by the action of the bent groove 13 and to form a minute clearance at the bent part 131 and in the vicinity of the bent part 131, as with the previously-described embodiments. In addition, the nacelle seal 12 is wrapped by an inner periphery of the concave part 310, which results in a three-dimensional labyrinth between the side wall 31A and the nacelle seal 12.

The labyrinth is formed by the bent groove 13 bent in an XZ plane of coordinates illustrated in FIG. 9B and the concave part 310 bent in an YZ plane when both of the AOC inlet seal 11 and the nacelle seal 12 are elastically deformed in the compressed state. The labyrinth is three-dimensionally intricate. Accordingly, it is possible to sufficiently block the flame that enters the inside of the concave part 310 from the fire-prevention region 6 to come through the bent groove 13.

Other than the above, the configurations described in the aforementioned embodiments may be selected or appropriately modified into other configurations without departing from the scope of the present invention.

The fire seal structure of one or more embodiments of the present invention is applicable to a portion at which elastic seals provided on members configuring the aircraft are abutted on each other, in addition to the AOC inlet seal 11 and the nacelle seal 12.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 Engine
2 Pylon (engine pylon)
2A Pylon fairing
3 Fan
5 Engine nacelle
5A Air inlet
5B Fan cowl
5C Thrust reverser cowl
6 Fire-prevention region
7 Engine oil cooler (heat exchanger)
8 Fitting
8A Intake duct
10 Fire seal structure
11 AOC inlet seal (First seal)
11A Side wall (wall)
11B Space
12 Nacelle seal (Second seal)
12A Part
13 Bent groove
13A Upper end
13B Lower end
14 to 18 Bent groove
14A Upper end
14B Lower end
20 Pylon main body
21 Pylon lower part (member)
22 Side wall
30 Fire seal structure
31 AOC inlet seal (first seal)
31A Side wall (wall)
70 AOC inlet frame (member, flame)
70A Opening
70B Rear end part
71 Intake duct
71A Intake port
73 Main body
74 Exhaust duct
75 Bellows
80, 82 Member
81, 84 Elastic seal
81A Side wall
83 wrinkles
131, 171, 172, 181, 182, 183 Bent part
132, 133 Extending part
310 Concave part
701 Side wall
D1 Front-rear direction (direction in which a first seal is compressed)
D2, D3 Direction
F Flame

What is claimed is:

1. A fire seal structure that prevents flame from coming out of a fire-prevention region of an aircraft, the fire seal structure comprising:
a first seal compressed and elastically deformed between two member of the aircraft; and
a second seal pressed against the first seal in a direction intersecting a compression direction in which the first seal is compressed,
wherein a wall of the first seal pressed by the second seal includes a bent groove including at least one bent part.

2. An aircraft comprising the fire seal structure according to claim 1.

3. The fire seal structure for the aircraft according to claim 1, wherein the bent groove is formed in advance on the wall of the first seal in an unloaded state.

4. An aircraft comprising the fire seal structure according to claim 3.

5. The fire seal structure for the aircraft according to claim 1, wherein the bent groove maintains the bent part while both of the first seal and the second seal are elastically deformed.

6. An aircraft comprising the fire seal structure according to claim 5.

7. The fire seal structure for the aircraft according to claim 1,
wherein the bent groove further includes extending parts that extend from the bent part toward both sides of the bent part, and
wherein the bent groove is bent to cause the extending parts to sandwich the bent part in a direction orthogonal to the compression direction of the first seal.

8. An aircraft comprising the fire seal structure according to claim 7.

9. The fire seal structure for the aircraft according to claim 1, wherein a region of the wall excluding the bent groove is made flat while no load is applied to the first seal.

10. An aircraft comprising the fire seal structure according to claim 9.

11. The fire seal structure for the aircraft according to claim 1, wherein the wall is recessed to follow a shape of a part to be pressed of the second seal while no load is applied to the first seal, and the wall is configured to wrap the pressed second seal.

12. An aircraft comprising the fire seal structure according to claim 11.

13. The fire seal structure for the aircraft according to claim 1,
wherein the first seal is compressed and elastically deformed in a front-rear direction between a frame and an engine pylon,
wherein the frame includes an opening that communicates, from forward, with an intake port of a heat exchanger supported to the engine pylon, and
wherein the second seal is provided on an engine nacelle of the aircraft, and is pressed against the first seal from the side and is elastically deformed in a direction intersecting the front-rear direction.

14. An aircraft comprising the fire seal structure according to claim 13.

* * * * *